C. C. CLAPP & F. KENNEY.
LEAD PIPE CONNECTIONS.

No. 185,075.    Patented Dec. 5, 1876.

UNITED STATES PATENT OFFICE.

CYRUS C. CLAPP AND FRANCIS KENNEY, OF HARTFORD, CONNECTICUT.

IMPROVEMENT IN LEAD-PIPE CONNECTIONS.

Specification forming part of Letters Patent No. 185,075, dated December 5, 1876; application filed October 31, 1876.

*To all whom it may concern:*

Be it known that we, C. C. CLAPP and F. KENNEY, of Hartford, in the county of Hartford and in the State of Connecticut, have invented certain new and useful Improvements in Lead-Pipe Connections; and do hereby declare that the following is a full, clear, and exact description thereof, reference being had to the accompanying drawings, and to the letters of reference marked thereon, making a part of this specification.

The nature of our invention consists in an improved method of joining lead pipe, as will be hereinafter more fully set forth.

Figure 1:
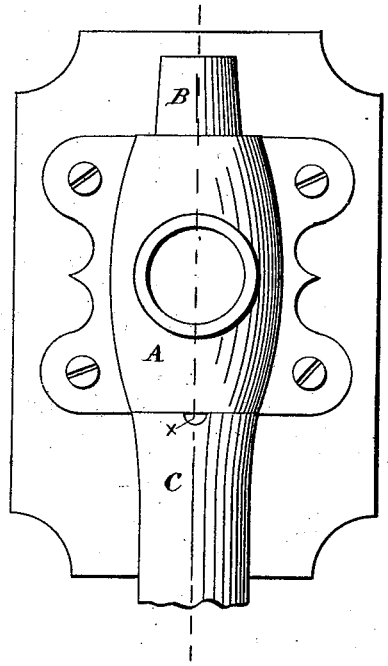
Figure 2:
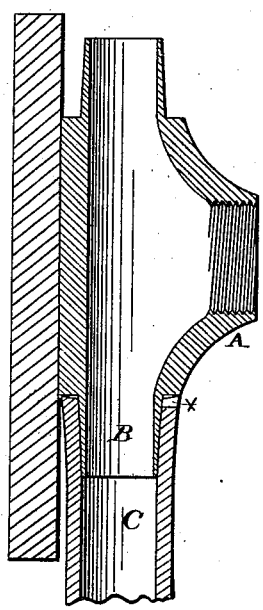
Figure 3:
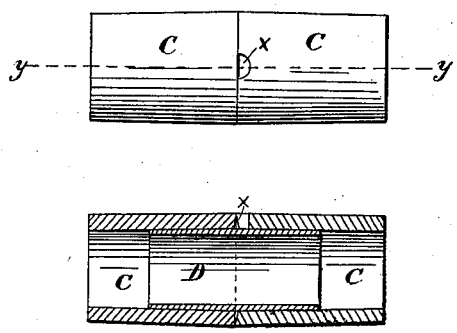

In the annexed drawing, Figure 1 is a side view of a fitting with lead pipe joined thereto. Fig. 2 is a longitudinal section of the same. Fig. 3 shows our method applied to joining two pieces of lead pipe together.

A represents a fitting, of any suitable construction, according to the work for which it is intended. This fitting is formed with a tubular tenon or socket, B, of slightly tapering form, which is tinned and then inserted into the lead pipe C up to the shoulder of such tenon. In the end of the lead pipe is a notch, $x$, to receive solder in making the joint, which is done with lamp and blow-pipe. Where two pieces of lead pipe are to be joined together a simple tubular fitting, D, is used, as shown in Fig. 3, the outside of such fitting being slightly tapering from the center toward both ends and solder put in through the notch $x$ in one of the pipes.

By experiment we have found this joint more durable than the wipe-joint, and it can be accomplished in about one-third the time, and in places where it would be impossible to make other joints.

Having thus fully described our invention, what we claim as new, and desire to secure by Letters Patent, is—

In joining lead pipes, a tinned metal fitting used in connection with a lead pipe having a notch in its end for the reception of solder, substantially as herein set forth.

In testimony that we claim the foregoing we have hereunto set our hands this 4th day of March, 1876.

CYRUS C. CLAPP.
FRANCIS KENNEY.

Witnesses:
D. W. CLARK,
URIAH CASE.